United States Patent
Taguchi et al.

(10) Patent No.: US 12,531,285 B2
(45) Date of Patent: Jan. 20, 2026

(54) THERMAL CHAIN DETERMINATION METHOD AND THERMAL CHAIN DETECTION SYSTEM FOR BATTERY PACK

(71) Applicant: Nissan Motor Co., Ltd., Yokohama (JP)

(72) Inventors: Hiromoto Taguchi, Kanagawa (JP); Ayuka Matsuyama, Kanagawa (JP); Kohei Kasedo, Kanagawa (JP); Qiye Yang, Kanagawa (JP); Xubin Zhou, Kanagawa (JP); Tomokazu Kobayashi, Kanagawa (JP); Ko Miyake, Kanagawa (JP); Hiroshi Ogawa, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 163 days.

(21) Appl. No.: 17/629,676

(22) PCT Filed: Apr. 14, 2021

(86) PCT No.: PCT/JP2021/015496
§ 371 (c)(1),
(2) Date: Jan. 24, 2022

(87) PCT Pub. No.: WO2022/219751
PCT Pub. Date: Oct. 20, 2022

(65) Prior Publication Data
US 2023/0141930 A1    May 11, 2023

(51) Int. Cl.
*H01M 10/48* (2006.01)
*B60L 3/00* (2019.01)
(Continued)

(52) U.S. Cl.
CPC ......... *H01M 10/482* (2013.01); *B60L 3/0046* (2013.01); *G01L 19/0092* (2013.01);
(Continued)

(58) Field of Classification Search
CPC ........... H01M 10/482; H01M 2220/20; H01M 10/613; H01M 10/6563; H01M 50/317;
(Continued)

(56) References Cited

U.S. PATENT DOCUMENTS

| | | |
|---|---|---|
| 2010/0136391 A1 | 6/2010 | Prilutsky et al. |
| 2016/0018472 A1 | 1/2016 | Sung et al. |

(Continued)

FOREIGN PATENT DOCUMENTS

| | | | |
|---|---|---|---|
| CN | 110398699 A | 11/2019 | |
| CN | 111717032 A * | 9/2020 | ............ B60L 3/0046 |

(Continued)

*Primary Examiner* — Sean P Cullen
*Assistant Examiner* — Heng M. Chan
(74) *Attorney, Agent, or Firm* — Young Basile Hanlon & MacFarlane, P.C.

(57) ABSTRACT

A battery pack includes cells, a pressure contributing component contributing to a change in pressure in the battery pack, at least one pressure sensor configured to detect the pressure in the battery pack, and at least one voltage sensor configured to detect a voltage of the cells. A thermal chain determination method includes detecting the pressure in the battery pack, detecting the voltage of the cells, determining that the pressure in the battery pack is abnormal when an amount or rate of change is larger than a predetermined value, determining that the voltage of the cells is abnormal when an amount or rate of change in the detected voltage is larger than a predetermined value, or when an absolute value of the voltage of the cells is smaller than a predetermined value, and determining that a thermal chain occurs when both the pressure and the voltage are abnormal.

11 Claims, 3 Drawing Sheets

(51) Int. Cl.
  *G01L 19/00*   (2006.01)
  *G01R 31/52*   (2020.01)
  *H01M 10/613*  (2014.01)
  *H01M 10/6563* (2014.01)
  *H01M 50/317*  (2021.01)

(52) U.S. Cl.
  CPC .......... *G01R 31/52* (2020.01); *H01M 10/613* (2015.04); *H01M 10/6563* (2015.04); *H01M 50/317* (2021.01); *B60L 2240/545* (2013.01); *B60L 2240/547* (2013.01); *H01M 2220/20* (2013.01)

(58) Field of Classification Search
  CPC ............. B60L 3/0046; B60L 2240/545; B60L 2240/547; G01L 19/0092; G01R 31/52
  See application file for complete search history.

(56) References Cited

U.S. PATENT DOCUMENTS

2019/0356023 A1    11/2019  Tenorio et al.
2020/0227708 A1*   7/2020   Ahn .................... H01M 50/298

FOREIGN PATENT DOCUMENTS

| CN | 112034358 A   |   | 12/2020 |
|----|---------------|---|---------|
| CN | 112394291 A   |   | 2/2021  |
| CN | 212579620 U   |   | 2/2021  |
| CN | 112549966 A   | * | 3/2021  |
| JP | 2011060755 A  |   | 3/2011  |
| JP | 2020087865 A  |   | 6/2020  |

* cited by examiner

THERMAL CHAIN DETERMINATION METHOD AND THERMAL CHAIN DETECTION SYSTEM FOR BATTERY PACK

TECHNICAL FIELD

The present invention relates to a thermal chain determination method and a thermal chain detection system for a battery pack.

BACKGROUND

In a battery pack containing a plurality of battery cells, when an abnormality such as an internal short circuit occurs in one battery cell, heat generated by this battery cell may cause heat generated by another battery cell, which may lead to a thermal chain (thermal runaway). Vehicles such as electric vehicles and hybrid vehicles on which a battery pack is mounted are required to include a system for detecting the thermal chain (thermal runaway) early and accurately in view of safety.

However, for example, when detecting the thermal chain by detecting a temperature, the thermal chain cannot be detected quickly since there is a time lag from an occurrence of an abnormality in one battery cell to a temperature rise inside the battery pack due to the thermal chain.

Regarding the above problem, JP2011-060755A discloses a system that detects a pressure in a battery pack and detects a thermal chain (thermal runaway) based on a change in the pressure in the battery pack. With this system, the thermal chain is detected based on the pressure, and thus the problem of time lag can be solved.

SUMMARY

In recent years, there is an increasing number of battery packs including a cooling system using a gas refrigerant and an exhaust gas passage for battery cells that couples the battery cells and the outside of a battery pack. In such a battery pack, when the refrigerant gas leaks into the battery pack, the pressure in the battery pack rises regardless of the thermal chain. Further, the pressure in the battery pack may change regardless of the thermal chain due to an influence of the exhaust gas passage coupled to the outside of the battery pack as well. For such a battery pack including a pressure contributing component that contributes to a pressure change in the battery pack, it is not possible to accurately detect the occurrence of the thermal chain by only detecting the pressure in the battery pack as in the technique described in JP2011-060755A, and there is a risk of erroneously detecting the thermal chain.

The present invention is made in view of the above problems, and an object of the present invention is to provide a thermal chain determination method and a thermal chain detection system for a battery pack that are capable of quickly and accurately detecting an occurrence of thermal chain.

A thermal chain determination method for a battery pack according to one embodiment of the present invention is a thermal chain determination method for a battery pack, the battery pack including a plurality of cells inside the battery pack, a pressure contributing component contributing to a change in a pressure in the battery pack, at least one pressure sensor configured to detect the pressure in the battery pack, and at least one voltage sensor configured to detect a voltage of the cells, the method including, detecting the pressure in the battery pack by the pressure sensor, detecting the voltage of the cells by the voltage sensor, determining that the pressure in the battery pack is abnormal when an amount of change or a rate of change in the detected pressure in the battery pack is larger than a predetermined value, determining that the voltage of the cells is abnormal when an amount of change or a rate of change in the detected voltage of the cells is larger than a predetermined value, or when an absolute value of the voltage of the cells is smaller than a predetermined value, and determining that a thermal chain occurs when both the pressure in the battery pack and the voltage of the cells are abnormal.

DETAILED DESCRIPTION

Hereinafter, embodiments of the present invention are described with reference to the drawings and the like.

First Embodiment

Figure 1:
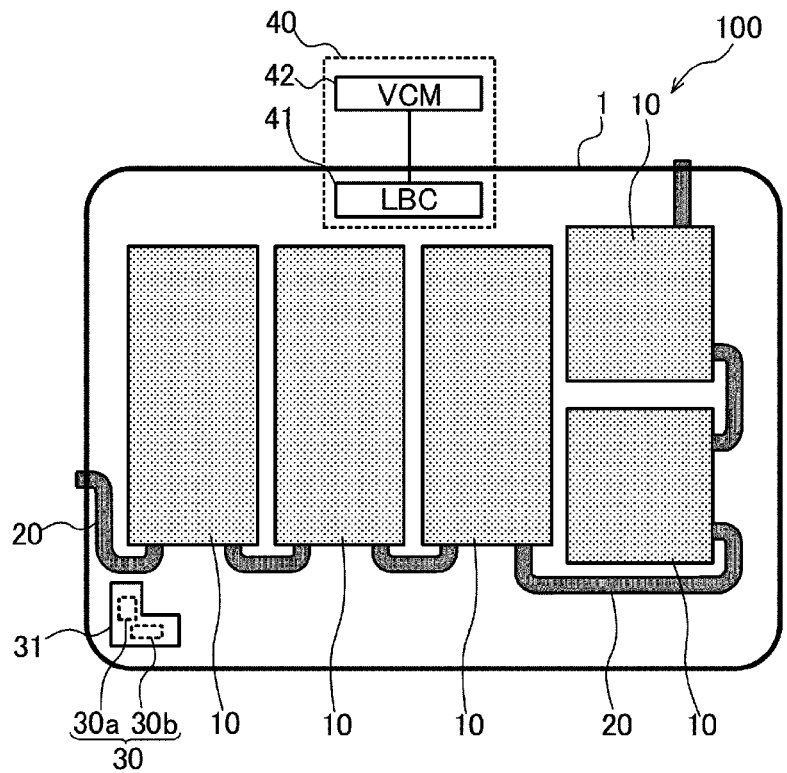
FIG. 1 is a schematic configuration diagram showing a main configuration of a thermal chain detection system for a battery pack according to a first embodiment of the present invention.

FIG. 1 is a schematic configuration diagram of a thermal chain detection system 100 for a battery pack (hereinafter, referred to as thermal chain detection system) according to the first embodiment of the present invention. The thermal chain detection system 100 is mounted on a vehicle such as an electric vehicle or a hybrid vehicle.

As shown in FIG. 1, the thermal chain detection system 100 includes a battery pack 1, a plurality of battery modules 10 housed in the battery pack 1, a refrigerant gas passage 20 that cools the battery modules 10, a plurality of pressure sensors 30 that detect a pressure in the battery pack 1, a controller 40, and the like. FIG. 1 is a cross-sectional view of the battery pack 1 as viewed from an upper surface direction. An upper surface of the battery pack 1 is covered with a cover portion although not shown. That is, the battery pack 1 is a so-called closed-type battery pack.

Each of the battery modules 10 is a cell stack (cells) formed by stacking a plurality of unit cells (not shown). The battery pack 1 houses the plurality of battery modules 10. The unit cells in the first embodiment are lithium ion secondary batteries, and are not necessarily limited thereto. Although not shown, the battery modules 10 are electrically connected to an external load by a lead wire or the like, and the battery modules 10 are also electrically connected to each other by a lead wire or the like. The number and an arrangement of the battery modules 10 in the battery pack 1 are optional and are not limited to those shown in FIG. 1.

The refrigerant gas passage 20 is a passage through which a refrigerant gas for cooling the battery modules 10 circulates and passes through each battery module 10. When the refrigerant gas leaks into the battery pack 1 from the refrigerant gas passage 20, the pressure in the battery pack 1 increases. That is, the refrigerant gas passage 20 is a pressure contributing component that contributes to a pressure change in the battery pack 1. In addition, the shape and the arrangement of the refrigerant gas passage 20 are not limited to those of FIG. 1 as long as the refrigerant gas passage 20 is capable of cooling the battery pack 1.

The pressure sensors 30 include a first pressure sensor 30a and a second pressure sensor 30b and detect a pressure P in the battery pack 1. The pressure sensors 30 are provided below a shielding plate 31 made of a metal plate or the like, and pressure measuring units of the pressure sensors 30 are directed at a bottom direction of the battery pack 1. By covering the pressure sensors 30 with the shielding plate 31 in this way, the pressure sensors 30 are protected by the shielding plate 31 even when a thermal chain, which will be described later, occurs in the battery pack and a high-temperature and high-pressure gas is ejected from the cells. That is, since the pressure sensors 30 are provided at a position where the pressure sensors 30 would not be affected by the thermal chain when the thermal chain occurs, the pressure sensors 30 operate normally even when the thermal chain occurs. The pressure P detected by the pressure sensors 30 is transmitted to the controller 40 described later.

The controller 40 is constituted by a computer including a central processing unit (CPU), a read-only memory (ROM), a random access memory (RAM), and an input and output interface (I/O interface), and performs an integrated control of the thermal chain detection system 100. The controller 40 may also be constituted by a plurality of microcomputers. The controller 40 controls the thermal chain detection system 100 by executing a specific program. The controller 40 executes, for example, a thermal chain detection control described later.

The controller 40 includes a battery controller (LBC) 41 and a vehicle control module (VCM) 42. The LBC 41 and the VCM 42 are connected to each other in a communicable manner by a CAN that is a communication line or the like.

The LBC 41 is provided in the battery pack 1 and is electrically connected to each battery module 10. The LBC 41 includes a plurality of voltage sensors that measure a voltage V of the cells of the battery modules 10 (hereinafter, referred to as voltage of the battery modules 10 or cell voltage). The cell voltage V acquired by the LBC is transmitted to the VCM 42.

The VCM 42 controls an entire system of the vehicle on which the thermal chain detection system 100 is mounted. As will be described later, the VCM 42 determines, for example, whether the acquired pressure P in the battery pack 1 and the cell voltage V are abnormal, and determines whether the thermal chain occurs in the battery pack 1.

In a battery pack housing a plurality of cells like the battery pack 1, when an abnormality such as an internal short circuit occurs in one cell, heat generated by this cell may cause heat generated by another cell, which may lead to the thermal chain (thermal runaway). Therefore, vehicles on which a battery pack is mounted are required to include a system for detecting the thermal chain (thermal runaway) early and accurately in view of safety (for example, EVS-GTR or the like).

However, for example, when the thermal chain is detected by detecting a temperature, the thermal chain cannot be detected quickly since there is a time lag from an occurrence of an abnormality in one cell to a temperature rise in the battery pack due to the thermal chain.

In a system that detects a pressure in a battery pack and detects the thermal chain based on a change in the pressure in the battery pack, the problem of time lag may be solved. However, in a battery pack that includes a cooling system (refrigerant gas passage 20) using a gas refrigerant as in the first embodiment, when a refrigerant gas leaks into the battery pack, the pressure inside the battery pack rises regardless of the thermal chain. Further, for example, in a battery pack that includes a gas discharge passage for discharge an exhaust gas of battery cells that couples the battery cells and the outside of the battery pack, the pressure in the battery pack may change regardless of the thermal chain due to an influence of the gas discharge passage coupled to the outside of the battery pack as well. For such a battery pack including the pressure contributing component that contributes to the pressure change in the battery pack, it is not possible to accurately detect the occurrence of the thermal chain by only detecting the pressure in the battery pack, and there is a risk of erroneously detecting the thermal chain.

Therefore, in the first embodiment, when both the pressure P in the battery pack 1 and the cell voltage V in the battery pack are abnormal, it is determined that the thermal chain occurs. Therefore, even when the pressure P in the battery pack 1 becomes abnormal due to the pressure contributing component that contributes to the pressure change in the battery pack, such as the refrigerant gas passage 20, it is not determined that the thermal chain occurs unless the voltage V of the battery module 10 is abnormal. Further, since the occurrence of the thermal chain is determined based on the pressure P and the voltage V, the thermal chain can be detected quickly. That is, the occurrence of the thermal chain can be detected quickly and accurately.

In addition, with improvement in safety of cells in recent years, there are many cases where no thermal chain is caused even when the cell voltage is abnormal due to the internal short circuit or the like, except that there is a risk of erroneously detecting the thermal chain by only detecting the cell voltage. In response to the above problem, in the first embodiment, it is determined that the thermal chain occurs only when both the pressure P in the battery pack 1 and the cell voltage V are abnormal, and thus the erroneous detection is prevented.

Figure 2:
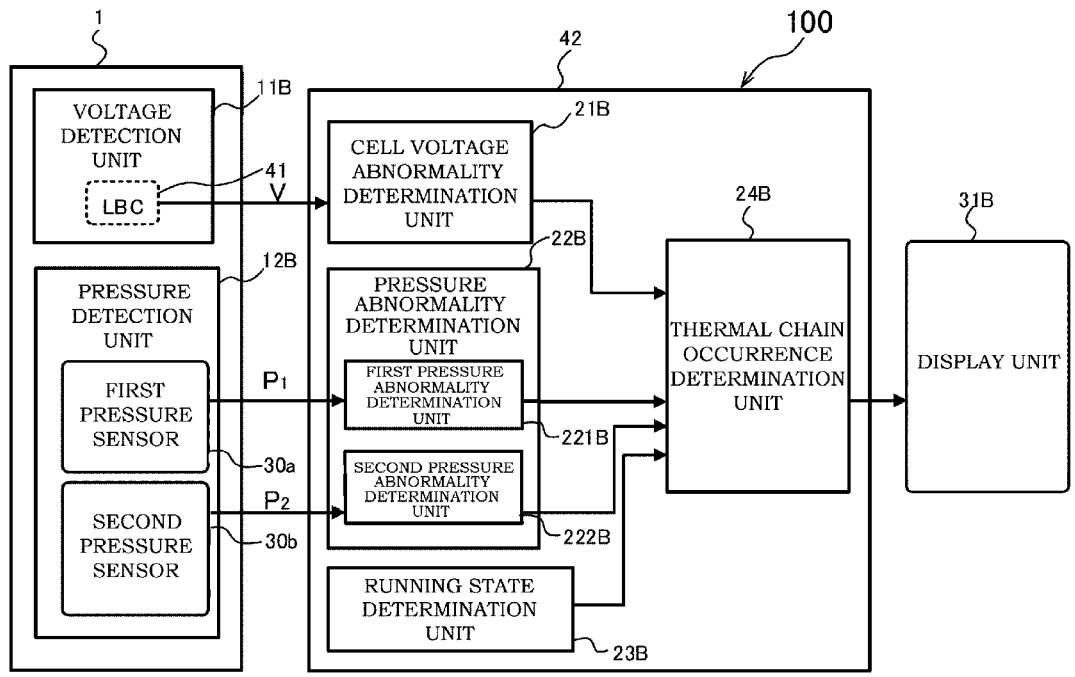
FIG. 2 is a block diagram showing a control configuration of the thermal chain detection system.

FIG. 2 is a block diagram showing a control configuration of the thermal chain detection system 100.

As shown in FIG. 2, the thermal chain detection system 100 includes a voltage detection unit 11B and a pressure detection unit 12B in the battery pack 1, a cell voltage abnormality determination unit 21B, a pressure abnormality determination unit 22B, a running state determination unit 23B and a thermal chain occurrence determination unit 24B that are a part of the VCM 42, and a display unit 31B.

The voltage detection unit 11B is constituted by the LBC 41 including the voltage sensors for measuring the cell voltage V of the battery modules 10. The cell voltage V detected by the LBC 41 is input to the cell voltage abnormality determination unit 21B of the VCM 42 at predetermined time intervals or at all times.

The pressure detection unit 12B is constituted by the first and second pressure sensors 30a and 30b that detect the pressure P in the battery pack 1. A pressure $P_1$ detected by the first pressure sensor 30a is input to a first pressure abnormality determination unit 221B and a pressure $P_2$ detected by the second pressure sensor 30b is input to a second pressure abnormality determination unit 222B of the VCM 42 at predetermined time intervals or at all times, respectively.

The cell voltage abnormality determination unit 21B determines whether the cell voltage V input from the voltage detection unit 11B is abnormal. Specifically, the cell voltage abnormality determination unit 21B determines whether an amount of change or a rate of change $\Delta V$ (hereinafter, referred to as the amount (rate) of change $\Delta V$) in the cell voltage V input at the predetermined time intervals or at all times is larger than a predetermined value $\Delta V_{th}$, and whether an absolute value of the cell voltage V is smaller than a predetermined value Vth. When the amount (rate) of change $\Delta V$ is larger than the predetermined value $\Delta V_{th}$, or when the absolute value of the cell voltage V is smaller than the predetermined value $V_{th}$, the cell voltage abnormality determination unit 21B determines that the cell voltage V is abnormal. The predetermined value $\Delta V_{th}$ here is, for example, a value of the amount (rate) of change in the voltage by which the cells can be regarded as being over-discharged. Similarly, the predetermined value $V_{th}$ is a value by which the cells can be regarded as being over-discharged when the absolute value of the cell voltage V is smaller than the $V_{th}$. The predetermined value $\Delta V_{th}$ or $V_{th}$ can be set in advance based on experiments, common technical knowledge and the like.

The cell voltage abnormality determination unit 21B determines that the cell voltage V is abnormal even when the internal short circuit is detected based on the input cell voltage V, when the cell voltage V is an invalid value, or when communication between the LBC 41 and the VCM 42 is poor. When the internal short circuit in one cell is detected, the cell is in an over-discharged state. When an abnormality occurs in the cells due to the thermal chain and an abnormality such as damage occurs in the voltage sensors, the cell voltage V is an invalid value. When an abnormality occurs in the cells due to the thermal chain and an abnormality such as damage occurs in the LBC 41 or the communication line CAN or the like between the LBC 41 and the VCM 42, the communication between the LBC 41 and VCM 42 is poor. In such a case, the cell voltage abnormality determination unit 21B determines that the cell voltage V is abnormal by regarding the amount (rate) of change $\Delta V$ in the cell voltage V as larger than the predetermined value $\Delta V_{th}$, or regarding the absolute value of the cell voltage V as smaller than the predetermined value $V_{th}$.

The cell voltage abnormality determination unit 21B determines that the cell voltage V is abnormal when at least one cell voltage V of the battery modules 10 is abnormal. For example, when it is assumed that the cell voltage V is determined to be abnormal only when values of all the voltage sensors of the LBC 41 are abnormal, there is a risk that the abnormality in the cell voltage V is not detected when a part of the voltage sensors of LBC 41 are faulty, or when a part of the cell voltages are not detected accurately for a certain reason. In such a case, there is a risk that the occurrence of the thermal chain cannot be detected. In response to the above problem, in the first embodiment, since it is determined that the cell voltage V is abnormal when at least one cell voltage V is abnormal, the thermal chain can also be detected when a part of the voltage sensors are faulty.

Since the VCM 42 including the cell voltage abnormality determination unit 21B is provided outside the battery pack 1, the VCM 42 is not affected by the high-temperature and high-pressure gas ejected from the cells even when the thermal chain occurs. Therefore, even when the abnormality such as damage occurs in the voltage detection unit 11B (LBC 41) or the communication line between the LBC 41 and the VCM 42 due to the high-temperature and high-pressure gas during the thermal chain, the VCM 42 can detect the poor communication with the LBC 41. That is, for example, even when the LBC 41 or the like is damaged due to the thermal chain, the VCM 42 can detect the abnormality of the cell voltage V.

When the cell voltage abnormality determination unit 21B determines that the cell voltage V is abnormal, a signal indicating that the cell voltage is abnormal is input from the cell voltage abnormality determination unit 21B to the thermal chain occurrence determination unit 24B.

The pressure abnormality determination unit 22B is constituted by the first pressure abnormality determination unit 221B and the second pressure abnormality determination unit 222B, and determines whether the pressure P in the battery pack 1 input from the pressure detection unit 12B is abnormal.

The pressure $P_1$ detected by the first pressure sensor 30a is input to the first pressure abnormality determination unit 221B and the pressure $P_2$ detected by the second pressure sensor 30b is input to the second pressure abnormality determination unit 222B at the predetermined time intervals or at all times, respectively.

The first pressure abnormality determination unit 221B and the second pressure abnormality determination unit 222B determine whether amounts of change or rates of change $\Delta P$ (hereinafter, referred to as the amount (rate) of change $\Delta P$) of the pressures $P_1$ and $P_2$ that are input at the predetermined time intervals or all the times are larger than a predetermined value $\Delta P_{th}$. The predetermined value $\Delta P_{th}$ here is a value corresponding to, for example, the amount of change or the rate of change in the pressure when the thermal chain occurs, and can be set in advance based on experiments, common technical knowledge and the like. The first pressure abnormality determination unit 221B and the second pressure abnormality determination unit 222B respectively determine that the pressures $P_1$ and $P_2$ are abnormal when the amounts (rates) of change $\Delta P$ of the input pressures $P_1$ and $P_2$ are larger than the predetermined value $\Delta P_{th}$. When the first pressure abnormality determination unit 221B or the second pressure abnormality determination unit 222B determines that the pressure is abnormal, a signal indicating that the pressure P in the battery pack 1 is abnormal is input from the pressure abnormality determination unit 22B to the thermal chain occurrence determination unit 24B.

In this way, when at least one of the first pressure abnormality determination unit 221B and the second pressure abnormality determination unit 222B determines that the pressure is abnormal, the signal indicating that the pressure P is abnormal is input to the thermal chain occurrence determination unit 24B. Therefore, even when one of the pressure sensors 30a and 30b is faulty, or when the pressure is not detected accurately for a certain reason, the abnormality of the pressure P in the battery pack 1 can be detected. Therefore, the thermal chain also can be detected when one of the pressure sensors 30a and 30b is faulty.

The running state determination unit 23B determines whether the vehicle is in a running state or a stopped state based on an accelerator operation of a driver or the like. A determination result of the running state determination unit 23B is input to the thermal chain occurrence determination unit 24B.

When receiving the signals indicating abnormality occurrence from both the cell voltage abnormality determination unit 21B and the pressure abnormality determination unit 22B, the thermal chain occurrence determination unit 24B determines that the thermal chain occurs. That is, the thermal chain occurrence determination unit 24B determines that the thermal chain occurs only when both the pressure P in the battery pack and the cell voltage V are abnormal. The signal indicating abnormality occurrence input from the pressure abnormality determination unit 22B here is a signal indicating abnormality occurrence input from either or both of the first pressure abnormality determination unit 221B and the second pressure abnormality determination unit 222B. Therefore, the thermal chain occurrence determination unit 24B determines that the thermal chain occurs when the cell voltage V and at least one of the pressures $P_1$ and $P_2$ in the battery pack are abnormal.

When the thermal chain occurrence determination unit 24B determines that the thermal chain occurs, a warning command is transmitted from the thermal chain occurrence determination unit 24B to the display unit 31B. In this case, the thermal chain occurrence determination unit 24B transmits the warning command to the display unit 31B together with a determination result input from the running state determination unit 23B.

The display unit 31B is, for example, a meter display provided on a dashboard of the vehicle, or the like. When receiving the warning command from the thermal chain occurrence determination unit 24B, the display unit 31B notifies the occurrence of the thermal chain of and issues a warning to occupants and the like. When the determination result of the running state determination unit 23B is the running state of the vehicle, the display unit 31B displays on a display, for example, the notification of the occurrence of the thermal chain and a warning urging to stop the vehicle and retreat to a safe place outside the vehicle to the occupants and the like. When the determination result of the running state determination unit 23B is the stopped state of the vehicle, the display unit 31B displays on the display, for example, the notification of the occurrence of the thermal chain and a warning urging to retreat to a safe place outside the vehicle to the occupants and the like. A method for notifying the occurrence of the thermal chain and warning is not limited to the display on the display, and may be performed by, for example, a voice of a speaker.

As described above, since the thermal chain detection system 100 detects the occurrence of the thermal chain based on the pressure P in the battery pack 1 and the cell voltage V, the thermal chain can be detected quickly. Further, it is determined that the thermal chain occurs when both the pressure P in the battery pack 1 and the cell voltage V are abnormal, and thus the erroneous detection on the occurrence of the thermal chain can be prevented.

Figure 3:
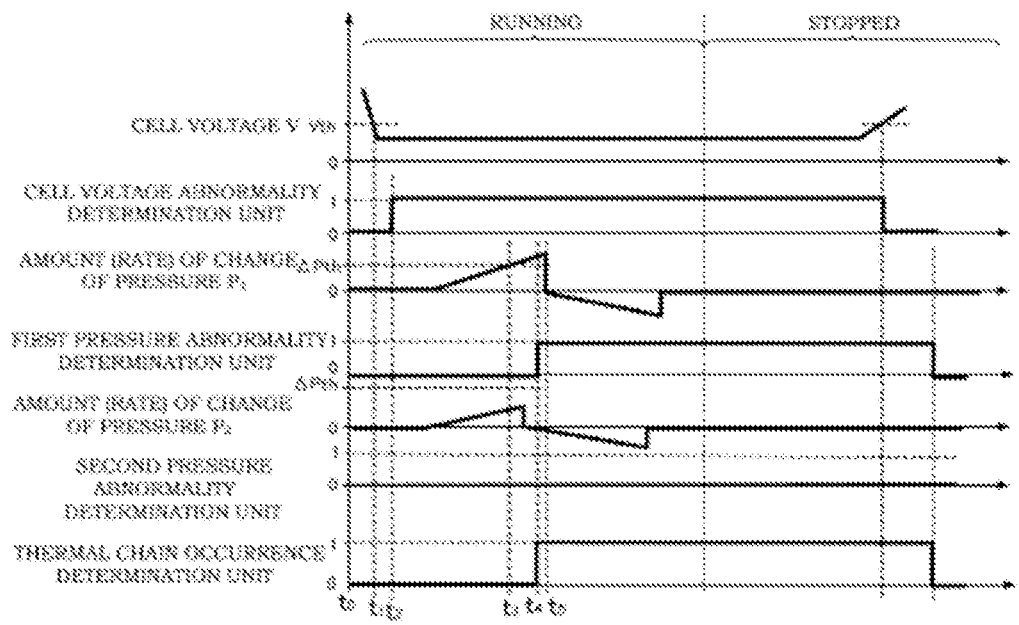
FIG. 3 is a timing chart showing a thermal chain detection method.

FIG. 3 is a timing chart showing a thermal chain detection method.

When the vehicle on which the thermal chain detection system 100 is mounted (hereinafter, simply referred to as the vehicle) is running, the cell voltage V is equal to or larger than the predetermined value $V_{th}$ from a time point t0 to a time point t1, and the amounts (rates) of change $\Delta P_1$ and $\Delta P_2$ of the pressures $P_1$ and $P_2$ detected by the first pressure sensor 30a and the second pressure sensor 30b are both equal to or less than the predetermined value $\Delta Pth$. In such a case, the cell voltage abnormality determination unit 21B, the pressure abnormality determination unit 22B, and the thermal chain occurrence determination unit 24B all maintain abnormality flags (0: normal, 1: abnormal) at 0 (normal).

When the cell voltage V lowers below the predetermined value $V_{th}$ that is a criteria for over-discharging at the time point $t_1$, the cell voltage abnormality determination unit 21B sets the abnormality flag of the cell voltage to 1 (abnormal) at a time point $t_2$ immediately after the time point $t_1$. A reason why the abnormality flag is set to 1 (abnormal) at the time point $t_2$ instead of the time point $t_1$ is to avoid determining the cell voltage V as abnormal when the cell voltage V momentarily lowers below the predetermined value $V_{th}$ for a certain reason. In other word, when the cell voltage V returns to the predetermined value $V_{th}$ or more between the time point $t_1$ and the time point $t_2$, the cell voltage abnormality determination unit 21B maintains the abnormality flag at 0 (normal).

When the abnormality flag is set to 1 (abnormal) at the time point $t_2$, the cell voltage abnormality determination unit 21B maintains the abnormality flag at 1 (abnormal) while the cell voltage V is lower than the predetermined value $V_{th}$.

The cell voltage abnormality determination unit 21B also sets the abnormality flag of the cell voltage to 1 (abnormal) when the internal short circuit is detected based on the cell voltage V, the cell voltage V is an invalid value, or the communication between the LBC 41 and the VCM 42 is poor.

At a time point $t_3$, when the amount (rate) of change $\Delta P_1$ of the pressure $P_1$ detected by the first pressure sensor 30a exceeds the predetermined value $\Delta P_{th}$, the first pressure abnormality determination unit 221B sets the abnormality flag of the pressure $P_1$ to 1 (abnormal) at a time point $t_4$ after a predetermined time from the time point $t_3$. The predetermined time here is a time during which the pressure in the battery pack 1 can be confirmed to be not changed accidentally only for a short time, and can be set in advance by experiments or the like. The erroneous detection of pressure abnormality is prevented by setting the abnormality flag to 1 (abnormal) at the time point $t_4$ after the predetermined time from the time point $t_3$.

The thermal chain occurrence determination unit 24B sets the abnormality flag to 1 (abnormal) when the abnormality flags of the cell voltage abnormality determination unit 21B and the first pressure abnormality determination unit 221B become 1 (abnormal) at the time point $t_4$. That is, the thermal chain is detected.

The abnormality flag becomes 0 at a time point $t_5$ after the amount (rate) of change $\Delta P_1$ of the pressure $P_1$ detected by the first pressure sensor 30a exceeds the predetermined value $\Delta P_{th}$, and then the amount (rate) of change $\Delta P_1$ decreases to a negative value (the pressure decreases). That is, after the time point $t_5$, the amount (rate) of change $\Delta P_1$ of the pressure $P_1$ is equal to or less than the predetermined value $\Delta P_{th}$. On the other hand, the first pressure abnormality determination unit 221B maintains the abnormality flag at 1 (abnormal) and continues an abnormality determination state for a predetermined time even when the amount (rate) of change $\Delta P_1$ of the pressure $P_1$ becomes equal to or less than the predetermined value $\Delta P_{th}$ after the abnormality flag is set to 1 (abnormal) at the time point $t_4$. That is, the abnormality flag is maintained at 1 (abnormal) even after $t_5$. In this way, the pressure abnormality determination unit 22B (the first pressure abnormality determination unit 221B) continues the pressure abnormality determination state for a predetermined time even when the amount (rate) of change $\Delta P$ in the pressure P in the battery pack 1 becomes equal to or less than the predetermined value $P_{th}$ after the pressure P in the battery pack 1 is determined to be abnormal. Therefore, the thermal chain also can be detected when the pressure P in the battery pack 1 is reduced in a short time after the thermal chain occurs. The predetermined time here is a time during which it can be confirmed that no thermal chain occurs, and can be set in advance by experiments or the like.

When the abnormality flag of the thermal chain occurrence determination unit 24B becomes 1 (abnormal) at the time point $t_4$, the notification of the occurrence of the thermal chain and the warning urging to stop the vehicle and retreat to a safe place outside the vehicle to the occupants and the like are performed at the same time by display on the meter display or the like.

When the vehicle is in the stopped state at the time point $t_5$, the display on the meter display or the like is switched to the notification of the occurrence of the thermal chain and the warning urging to retreat to a safe place outside the vehicle to the occupants and the like.

Although the case where the amount (rate) of change $\Delta P_1$ of the pressure $P_1$ detected by the first pressure sensor 30a exceeds the predetermined value $\Delta P_{th}$ is described in FIG. 3, the same thermal chain detection method can be used when the amount (rate) of change $\Delta P_2$ of the pressure $P_2$ detected by the second pressure sensor 30b exceeds the predetermined value $\Delta P_{th}$. That is, when the amount (rate) of change $\Delta P_2$ of the pressure $P_2$ exceeds the predetermined value $\Delta P_{th}$, the second pressure abnormality determination unit 222B sets the abnormality flag to 1 (abnormal). When the abnormality flags of the cell voltage abnormality determination unit 21B and the second pressure abnormality determination unit 222B become 1 (abnormal), the thermal chain occurrence determination unit 24B sets the abnormality flag to 1 (abnormal) and the thermal chain is detected.

Although the case where the absolute value of the cell voltage V lowers below the predetermined value $V_{th}$ is described in FIG. 3, when the amount (rate) of change $\Delta V$ of the cell voltage V is larger than the predetermined value $\Delta V_{th}$, the cell voltage abnormality determination unit 21B similarly sets the abnormality flag to 1 (abnormal). Further, as described above, when the internal short circuit is detected based on the cell voltage V, when the cell voltage V is an invalid value, or when the communication between the LBC 41 and the VCM 42 is poor, the cell voltage abnormality determination unit 21B sets the abnormality flag to 1 (abnormal) by regarding the amount (rate) of change $\Delta V$ in the cell voltage V as larger than the predetermined value $\Delta V_{th}$, or regarding the absolute value of the cell voltage V as smaller than the predetermined value $V_{th}$.

Figure 4:
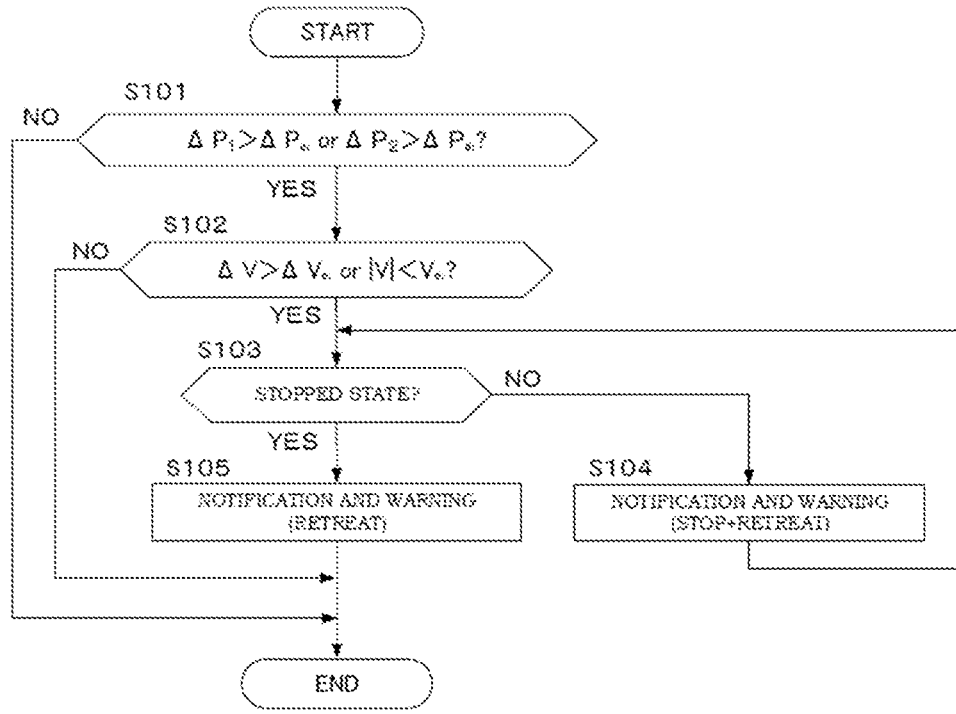
FIG. 4 is a flowchart showing the thermal chain detection method.

FIG. 4 is a flowchart showing the thermal chain detection method of the battery pack 1. All of the following controls are repeatedly executed by the controller 40 at predetermined time intervals.

When the thermal chain detection system 100 is activated, for example, by pressing an ignition switch of the vehicle, the controller 40 starts a thermal chain detection control. From the start to the end of the thermal chain detection control, the controller 40 constantly acquires the pressures $P_1$ and $P_2$ in the battery pack 1 detected by the first and second pressure sensors 30a and 30b, the cell voltage V detected by the voltage sensors of the LBC 41, and information on the running state of the vehicle, or acquire these information at predetermined time intervals.

In step S101, the controller 40 determines whether the pressure P in the battery pack 1 is abnormal. The controller 40 determines whether the amount (rate) of change $\Delta P_1$ of the pressure $P_1$ detected by the first pressure sensor 30a and the amount (rate) of change $\Delta P_2$ of the pressure $P_2$ detected by the second pressure sensor 30b are larger than the predetermined value $\Delta P_{th}$. Then, the controller 40 determines that the pressure P in the battery pack 1 is abnormal when either or both of the amount (rate) of change $\Delta P_1$ of the pressure $P_1$ and the amount (rate) of change $\Delta P_2$ of the pressure $P_2$ are larger than the predetermined value $\Delta P_{th}$. The controller 40 determines that the pressure P is abnormal when the pressure P in the battery pack 1 is abnormal within a predetermined time. That is, when the amount (rate) of change $\Delta P$ of the pressure P in the battery pack 1 becomes larger than the predetermined value $\Delta P_{th}$, the controller 40 determines that the pressure P is abnormal within the predetermined time even when the amount (rate) of change $\Delta P$ of the pressure P subsequently becomes equal to or less than the predetermined value $\Delta P_{th}$.

When the pressure P in the battery pack 1 is abnormal, the controller 40 executes step S102. On the other hand, when the pressure P in the battery pack 1 is not abnormal, the controller 40 determines that no thermal chain occurs and ends the thermal chain detection control.

In step S102, the controller 40 determines whether the cell voltage V is abnormal. When the amount of change or the rate of change $\Delta V$ of the cell voltage V detected by the voltage sensors of the LBC 41 is larger than the predetermined value $\Delta V_{th}$, or the absolute value of the cell voltage V is smaller than the predetermined value $V_{th}$, the controller 40 determines that the cell voltage V is abnormal. The controller 40 may determine the abnormality of the cell voltage V based on both the amount (rate) of change $\Delta V$ of the cell voltage V and the absolute value of the cell voltage V, and may determine the abnormality of the cell voltage V based on one of the amount (rate) of change $\Delta V$ and the absolute value. Further, the controller 40 determines that the cell voltage V is abnormal when at least one cell voltage V detected by the voltage sensors of the LBC 41 is abnormal. When the cell voltage V is abnormal, the controller 40 determines that the occurrence of the thermal chain is detected, and executes step S103. On the other hand, when the cell voltage V is not abnormal, the controller 40 determines that no thermal chain occurs and ends the thermal chain detection control.

In step S103, the controller 40 determines whether the vehicle is in the stopped state based on the accelerator operation of the driver or the like. When the vehicle is in the running state, the controller 40 executes step S104. On the other hand, when the vehicle is in the stopped state, the controller 40 executes step S105.

When the vehicle is in the running state, in step S104, the controller 40 executes the notification of the occurrence of the thermal chain and the warning urging to stop the vehicle and retreat to a safe place outside the vehicle to the occupants and the like. The notification and the warning are executed by display on the meter display or the like. When the notification and the warning are executed, the controller 40 returns to step S103. In step S103, when the vehicle is still in the running state, the notification of the occurrence of the thermal chain and the warning urging to stop the vehicle and retreat to a safe place outside the vehicle are continued. On the other hand, when the vehicle is in the stopped state, the controller 40 executes step S105.

When the vehicle is in the stopped state in step S103, the controller 40 executes in step S105 the notification of the occurrence of the thermal chain and the warning urging to retreat to a safe place outside the vehicle to the occupants and the like. The notification and the warning are executed by display on the meter display or the like. When the notification and the warning are executed, the controller 40 ends the thermal chain detection control.

According to the thermal chain determination method and the thermal chain detection system 100 for the battery pack 1 of the first embodiment described above, the following effects can be achieved.

According to the thermal chain determination method for the battery pack 1, it is determined that the pressure P in the battery pack 1 is abnormal when the amount of change or the rate of change ΔP of the pressure P in the battery pack 1 is larger than the predetermined value $\Delta P_{th}$. When the amount of change or the rate of change ΔV of the cell voltage V is larger than the predetermined value $\Delta V_{th}$, or when the absolute value of the cell voltage V is smaller than the predetermined value $V_{th}$, it is determined that the cell voltage V is abnormal. Then, it is determined that the thermal chain occurs when both the pressure P in the battery pack 1 and the cell voltage V are abnormal. As a result, even when the pressure P in the battery pack 1 becomes abnormal due to the pressure contributing component that contributes to the pressure change in the battery pack 1, such as the refrigerant gas passage 20, it is not determined that the thermal chain occurs unless the voltage V of the battery module 10 is abnormal. Therefore, when the pressure P in the battery pack 1 changes regardless of the thermal chain, the erroneous detection of the occurrence of the thermal chain is prevented. Further, since the occurrence of the thermal chain is determined based on the pressure P in the battery pack 1 and the cell voltage V, the thermal chain can be detected quickly. That is, the occurrence of the thermal chain can be detected quickly and accurately.

Since it is determined that the thermal chain occurs when both the pressure P in the battery pack 1 and the cell voltage V are abnormal, the erroneous detection of the occurrence of the thermal chain is prevented when the cell voltage V is abnormal due to the internal short circuit or the like and the thermal chain does not occur.

According to the thermal chain determination method for the battery pack 1, the battery pack 1 includes a plurality of pressure sensors 30a and 30b. When the amount of change or the rate of change ΔP of the pressure in the battery pack 1 detected by at least one of the pressure sensors 30 is larger than the predetermined value $\Delta P_{th}$, it is determined that the pressure P in the battery pack 1 is abnormal. As a result, even when a part of the pressure sensors 30 are faulty, or when the value of the pressure P by a part of the pressure sensors 30 is not detected accurately for a certain reason, the abnormality of the pressure P in the battery pack 1 can be detected. Therefore, the thermal chain also can be detected when a part of the pressure sensors 30 are faulty.

According to the thermal chain determination method for the battery pack 1, the battery pack 1 includes a plurality of voltage sensors that detect the voltage V of different cells. In addition, when the amount of change or the rate of change ΔV of the cell voltage V detected by at least one of the voltage sensor is larger than the predetermined value $\Delta V_{th}$, or when the absolute value of the cell voltage V is smaller than the predetermined value $V_{th}$, it is determined that the cell voltage V is abnormal. As a result, even when a part of the voltage sensors are faulty, or when the value of the voltage V by a part of the voltage sensors is not detected accurately for a certain reason, the abnormality of the cell voltage V can be detected. Therefore, the thermal chain also can be detected when a part of the voltage sensors are faulty.

According to the thermal chain determination method for the battery pack 1, even when the amount of change or the rate of change ΔP of the pressure P in the battery pack 1 becomes equal to or less than the predetermined value $\Delta P_{th}$ after the pressure P in the battery pack 1 is determined to be abnormal, the pressure abnormality determination state is continued for the predetermined time. Therefore, the thermal chain also can be detected when the pressure P in the battery pack 1 is reduced in a short time after the thermal chain occurs.

According to the thermal chain determination method for the battery pack 1, it is determined that the cell voltage V is abnormal in any one of the cases where the internal short circuit is detected based on the cell voltage V detected by the voltage sensor, where the cell voltage V detected by the voltage sensor is an invalid value, or where the communication between the battery controller (LBC) 41 and the vehicle controller (VCM) 42 is poor. That is, in these cases, it can be regarded that the amount of change or the rate of change ΔV of the cell voltage V is larger than the predetermined value $\Delta V_{th}$, or the absolute value of the cell voltage V is smaller than the predetermined value $V_{th}$. Therefore, the thermal chain can be detected more accurately in various scenes by determining that the cell voltage V is abnormal in such a case.

According to the thermal chain detection system 100 for the battery pack 1, the controller 40 determines that the thermal chain occurs when both the pressure P in the battery pack 1 and the cell voltage V are abnormal. Therefore, when the pressure P in the battery pack 1 changes regardless of the thermal chain, the erroneous detection of the occurrence of the thermal chain is prevented. Further, since the occurrence of the thermal chain is determined based on the pressure P in the battery pack 1 and the cell voltage V, the thermal chain can be detected quickly. That is, the occurrence of the thermal chain can be detected quickly and accurately.

According to the thermal chain detection system 100 for the battery pack 1, the controller 40 determines that the cell voltage V is abnormal in any one of the cases where the internal short circuit is detected, where the cell voltage V is an invalid value, or where the communication between the battery controller (LBC) 41 and the vehicle controller (VCM) 42 is poor. That is, in these cases, it can be regarded that the amount of change or the rate of change ΔV of the cell voltage V is larger than the predetermined value $\Delta V_{th}$, or the absolute value of the cell voltage V is smaller than the predetermined value $V_{th}$. Therefore, the thermal chain can be detected more accurately in various scenes by determining that the cell voltage V is abnormal in such a case.

According to the thermal chain detection system 100 for the battery pack 1, the pressure sensors 30 are provided at a position where the pressure sensors 30 would not be affected by the thermal chain in the battery pack 1 when the thermal chain occurs in the battery pack 1. Therefore, even when the thermal chain occurs in the battery pack 1, the pressure sensors 30 operate normally and can detect the change in the pressure P in the battery pack 1.

According to the thermal chain detection system 100 for the battery pack 1, the voltage sensors are provided in the battery pack 1, and the vehicle controller (VCM) 42 is provided outside the battery pack 1. As a result, even when the thermal chain occurs, the VCM 42 provided outside the battery pack 1 is not affected by the high-temperature and high-pressure gas ejected from the cells. Therefore, even when the abnormality such as damage occurs in the voltage detection unit 11B (LBC 41) or the communication line between the LBC 41 and the VCM 42 due to the high-temperature and high-pressure gas during the thermal chain, the VCM 42 can detect failure of communication with the LBC 41 and detect the abnormality in the cell voltage V. Therefore, for example, even when the voltage detection unit 11B (LBC 41) or the like is damaged by the thermal chain, the thermal chain can be detected.

Although the first embodiment has a configuration provided with two pressure sensors 30a and 30b, the number of pressure sensors 30 is optional and is not limited to two. It is preferable to provide a plurality of pressure sensors 30, and the configuration may be provided with only one pressure sensor 30. In such a case as well, it is determined that the thermal chain occurs when both the pressure P in the battery pack 1 and the cell voltage V are abnormal, and thus the erroneous detection of the occurrence of the thermal chain can be prevented. Further, for example, the configuration may be provided with three or more pressure sensors 30. In such a case, when the amount (rate) of change $\Delta P$ of the pressure P detected by at least one of the pressure sensors 30 is larger than the predetermined value $\Delta P_{th}$, it is determined that the pressure P in the battery pack 1 is abnormal.

As in the first embodiment, the pressure sensors 30 are preferably provided at a position where the pressure sensors 30 would not be affected by the thermal chain even when the thermal chain occurs. Alternatively, the present invention is not necessarily limited thereto, and the pressure sensors 30 may be provided anywhere in the battery pack 1.

In the first embodiment, the battery pack 1 is a closed-type battery pack. Alternatively, the present invention is not limited thereto, and the battery pack 1 may be an open-type battery pack whose upper portion is not covered with a cover portion.

In the first embodiment, the cell voltage abnormality determination unit 21B and the pressure abnormality determination unit 22B transmit a signal to the thermal chain occurrence determination unit 24B only in the case of the abnormality. Alternatively, the present invention is not limited thereto, and the cell voltage abnormality determination unit 21B and the pressure abnormality determination unit 22B may transmit a result of abnormality determination (that is, a signal indicating abnormality or normality). In this case, when determination results of the cell voltage abnormality determination unit 21B and the pressure abnormality determination unit 22B are both abnormal, the thermal chain occurrence determination unit 24B determines that the thermal chain occurs.

Second Embodiment

A thermal chain detection system 200 for a battery pack according to the second embodiment will be described with reference to FIGS. 5 and 6. The same elements as those in the first embodiment are denoted by the same reference numerals, and descriptions thereof will be omitted.

Figure 5:
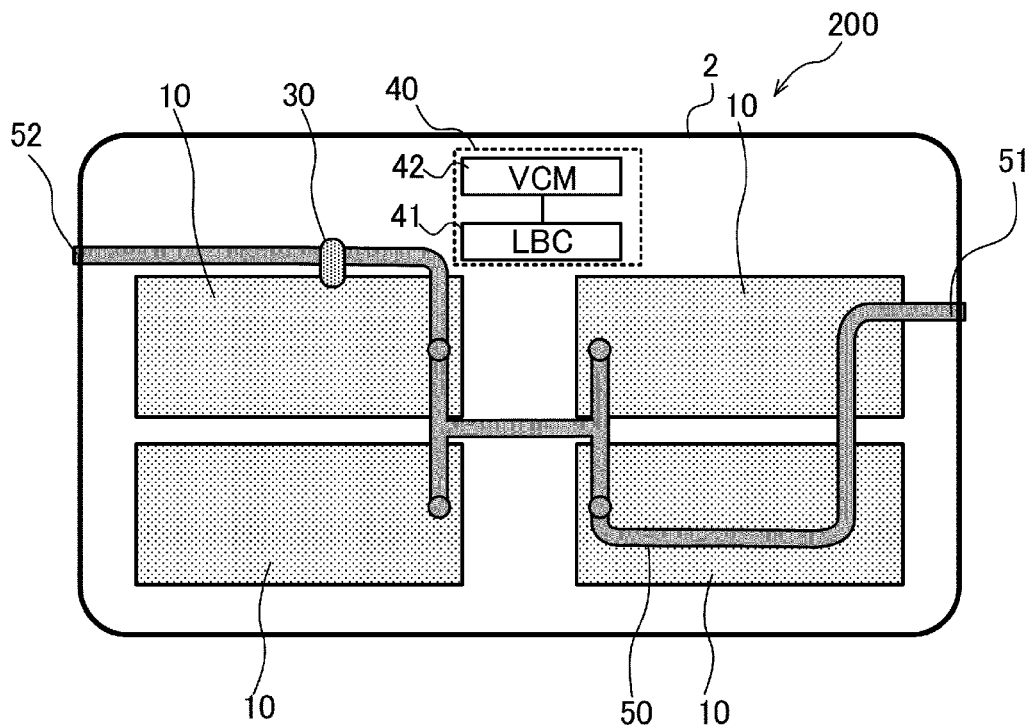
FIG. 5 is a schematic configuration diagram showing a main configuration of a thermal chain detection system for a battery pack according to a second embodiment of the present invention.

FIG. 5 is a schematic configuration diagram of the thermal chain detection system 200 according to the second embodiment. The second embodiment is different from the first embodiment in that a battery pack 2 is an open-type, a pressure contributing component is a gas discharge passage 50, and the like.

As shown in FIG. 5, the thermal chain detection system 200 includes the battery pack 2, the battery modules 10 in the battery pack 2, the gas discharge passage 50 through which an exhaust gas from cells constituting the battery module 10 flows, the controller 40, and the like. FIG. 5 is a cross-sectional view of the battery pack 2 as viewed from an upper surface direction, and an upper surface of the battery pack 2 is not covered. That is, the battery pack 2 is a so-called open-type battery pack.

The gas discharge passage 50 is a passage for discharging the exhaust gas of the cells, and is coupled to the battery modules 10 (cells) and the outside of the battery pack 2. An upstream end portion 51 of the gas discharge passage 50 is closed, and the exhaust gas from the cells flows toward a downstream end portion 52 of the gas discharge passage 50. The gas discharge passage 50 is coupled to one of the cells in the battery pack 2, and the gas discharge passage 50 downstream of the portion coupled to the cell is provided with a pressure sensor 30 that detects the pressure of the battery pack 2. In this way, since the gas discharge passage 50 is coupled to one of the cells and the pressure sensor 30 is downstream of the coupling portion, it is not necessary to provide the pressure sensor 30 for each cell, and the number of the pressure sensors can be reduced.

Similar to the first embodiment, the arrangement and the number of the battery modules 10 (cells) in the battery pack 2 are optional and are not limited to those in FIG. 5.

When there is a variation in the arrangement of the battery modules 10 (cells) in the battery pack 2, the position of the gas discharge passage 50 coupled to the cells also varies. However, in this case, a position variation absorption structure such as a bellows may be provided at a part of the gas discharge passage 50 to widen a movable range of the gas discharge passage 50. That is, the degree of freedom in layout of the battery modules 10 can be increased by providing the position variation absorption structure at the gas discharge passage 50.

Here, it is easier to detect a change in the pressure when the pressure sensor 30 is provided at a position closer to the battery modules 10 (cells) downstream of the coupling portion of the gas discharge passage 50. On the other hand, when the pressure sensor 30 is exposed to the high-temperature and high-pressure gas ejected from the cells when the thermal chain occurs, there is a risk of a defect such as a failure. Therefore, considering relations between a detection capability of the device and a pressure resistance and a heat resistance of the device, the pressure sensor 30 is arranged at a most appropriate position determined by tests, experiments and the like.

As the change in the pressure in the gas discharge passage 50 is more remarkable, the pressure sensor 30 detects the change in the pressure more easily. However, when the pressure in the gas discharge passage 50 is excessively high, the gas discharge passage 50 may be damaged. Therefore, considering the relation between the detection capability of the pressure sensor 30 and the pressure resistance of the gas discharge passage 50, an internal hydraulic diameter of the gas discharge passage 50 is adjusted to a most appropriate value determined by tests, experiments and the like.

The downstream end portion 52 of the gas discharge passage 50 is closed by an air-permeable membrane (not shown) that adjusts the pressure in the gas discharge passage 50. The air-permeable membrane is a pressure adjusting mechanism that adjusts the pressure in the gas discharge passage 50 by making air permeable or impermeable by a pressure difference between the inside and outside of the gas discharge passage 50. However, as in the case where the thermal chain occurs, when the pressure in the gas discharge passage 50 suddenly becomes high, the air-permeable membrane is deviated from the gas discharge passage 50 and is blown off. Further, the pressure adjusting mechanism is not limited to the air-permeable membrane, and may be any known member as long as the pressure in the gas discharge passage 50 can be adjusted.

The pressure P in the battery pack 2 detected by the pressure sensor 30 is transmitted to the LBC 41.

The controller 40 includes the LBC 41 and the VCM 42, and the LBC 41 and the VCM 42 are connected to each other in a communicable manner with the CAN that is a communication line or the like. In the second embodiment, since the battery pack 2 is an open-type, even when the LBC 41 and VCM 42 are arranged in the battery pack 2, the LBC 41 and the VCM 42 are not easily affected by the high-temperature and high-pressure gas ejected from the cells when the thermal chain occurs. Therefore, both the LBC 41 and the VCM 42 are provided in the battery pack 2. As a result, the thermal chain detection system 100 is made compact.

The LBC 41 includes a plurality of voltage sensors (not shown) for measuring the cell voltage V of the battery modules 10. In addition, the LBC 41 determines whether the pressure P in the battery pack 2 received from the pressure sensor 30 and the voltage V of the battery modules 10 (cells) acquired by the voltage sensor are abnormal.

The VCM 42 controls an entire system of a vehicle. For example, the VCM 42 determines whether the thermal chain occurs in the battery pack 2 and transmits a command for displaying a notification of the occurrence of the thermal chain and a warning to the display unit 31B.

Figure 6:
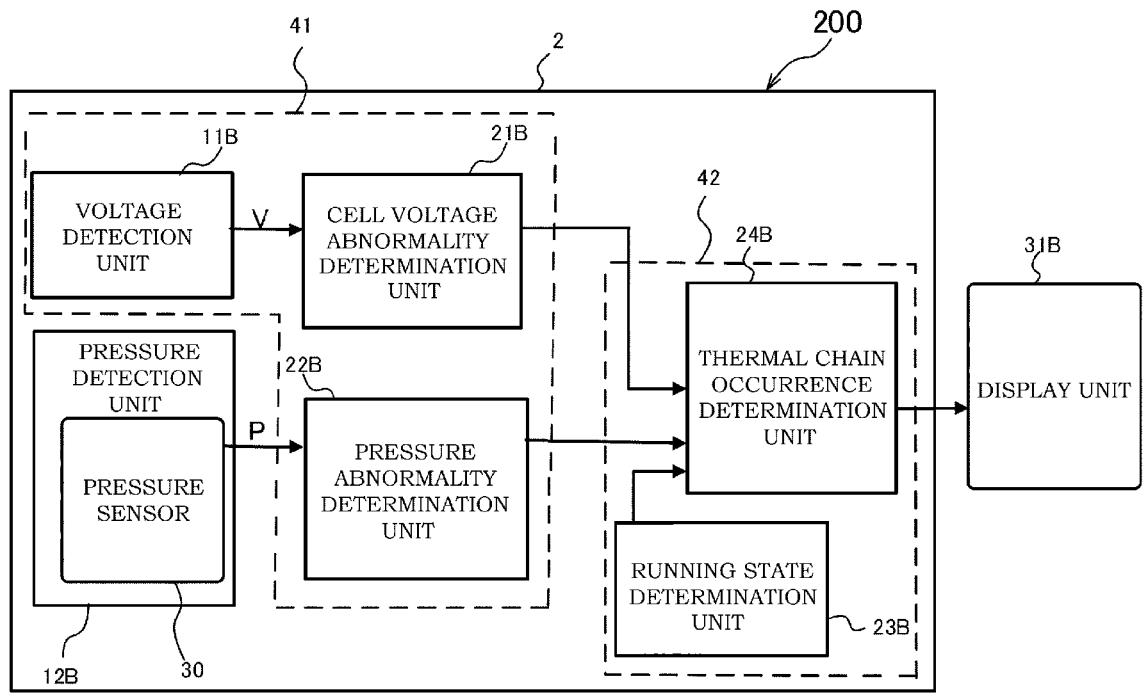
FIG. 6 is a block diagram showing a control configuration of the thermal chain detection system according to the second embodiment.

FIG. 6 is a block diagram showing a control configuration of the thermal chain detection system 200 for the battery pack according to the second embodiment.

As shown in FIG. 6, the thermal chain detection system 200 includes the voltage detection unit 11B, the pressure detection unit 12B, the cell voltage abnormality determination unit 21B, the pressure abnormality determination unit 22B, the running state determination unit 23B and the thermal chain occurrence determination unit 24B in the battery pack 2, and the display unit 31B. In the second embodiment, the voltage detection unit 11B, the cell voltage abnormality determination unit 21B and the pressure abnormality determination unit 22B constitute a part of the LBC 41, and the running state determination unit 23B and the thermal chain occurrence determination unit 24B constitute a part of the VCM 42.

The voltage detection unit 11B includes voltage sensors for measuring the cell voltage V of the cells, which are included in the LBC 41. The cell voltage V detected by the voltage sensors is input to the cell voltage abnormality determination unit 21B at predetermined time intervals or at all times.

The pressure detection unit 12B is constituted by the pressure sensor 30 that detects the pressure P in the battery pack 2. The pressure P in the battery pack 2 detected by the pressure sensor 30 is input to the pressure abnormality determination unit 22B of the LBC 41 at predetermined time intervals or at all times.

The cell voltage abnormality determination unit 21B determines whether the cell voltage V input from the voltage detection unit 11B is abnormal. The specific determination method is the same as that of the first embodiment and the like, and thus the descriptions are omitted.

When the cell voltage abnormality determination unit 21B determines that the cell voltage V is abnormal, a signal indicating that the cell voltage is abnormal is input from the cell voltage abnormality determination unit 21B to the thermal chain occurrence determination unit 24B.

The pressure abnormality determination unit 22B determines whether the pressure P in the battery pack 2 input from the pressure detection unit 12B is abnormal. The specific determination method is the same as that of the first embodiment, and thus the descriptions are omitted.

When the pressure P in the battery pack 2 becomes high, the air-permeable membrane (pressure adjusting mechanism) that closes the downstream end portion 52 of the gas discharge passage 50 is deviated, and the pressure P is almost constant after the pressure in the gas discharge flow path 50 is reduced. Therefore, even when the amount (rate) of change $\Delta P$ of the pressure P in the battery pack 2 becomes equal to or less than the predetermined value $\Delta P_{th}$ after the pressure P in the battery pack 2 is determined to be abnormal, the pressure abnormality determination unit 22B continues a pressure abnormality determination state for a predetermined time. As a result, even when the $\Delta P$ lowers below the predetermined value $\Delta P_{th}$ due to an action of the pressure adjusting mechanism after the amount (rate) of change $\Delta P$ of the pressure P in the battery pack 2 becomes larger than the predetermined value $\Delta P_{th}$, the pressure P can be detected as abnormal.

The running state determination unit 23B determines whether the vehicle is in a running state or a stopped state based on an accelerator operation of a driver or the like. A determination result of the running state determination unit 23B is input to the thermal chain occurrence determination unit 24B.

When receiving input signals indicating abnormality occurrence from both the cell voltage abnormality determination unit 21B and the pressure abnormality determination unit 22B, the thermal chain occurrence determination unit 24B determines that the thermal chain occurs, and transmits a warning command to the display unit 31B. Similar to the first embodiment, in this case, the thermal chain occurrence determination unit 24B transmits the warning command to the display unit 31B together with the determination result input from the running state determination unit 23B.

When receiving the warning command from the thermal chain occurrence determination unit 24B, the display unit 31B notifies the occurrence of the thermal chain of and issues a warning to occupants and the like. A method for notifying and warning a user is the same as that of the first embodiment, and thus the descriptions are omitted.

According to the thermal chain determination method and the thermal chain detection system 200 for the battery pack 2 of the second embodiment described above, the following effects can be further achieved.

According to the thermal chain determination method for the battery pack 2, even when the amount of change or the rate of change $\Delta P$ of the pressure P becomes equal to or less than the predetermined value $\Delta P_{th}$ after the pressure P in the battery pack 2 is determined to be abnormal, the pressure abnormality determination state is continued for a predetermined time. As a result, even when the amount of change or the rate of change $\Delta P$ of the pressure P in the battery pack 2 becomes equal to or less than the predetermined value $\Delta P_{th}$ due to an action of the pressure adjusting mechanism or the like after the amount of change or the rate of change $\Delta P$ of the pressure P in the battery pack 2 becomes greater than the predetermined value $\Delta P_{th}$, the pressure P can be detected as abnormal. That is, the thermal chain can be detected accurately.

According to the thermal chain detection system 200, the gas discharge passage 50 that couples the battery modules 10 (cells) and the outside of the battery pack 2 is provided, and the gas discharge passage 50 includes the pressure adjusting mechanism that adjusts the pressure in the gas discharge passage 50. As a result, even when the pressure in the gas discharge passage 50 changes regardless of the thermal chain, the pressure in the gas discharge passage 50 is adjusted by the pressure adjusting mechanism, and thus an erroneous detection on the thermal chain can be further prevented.

According to the thermal chain detection system 200, the gas discharge passage 50 is coupled to one of the battery modules 10 (cells) in the battery pack 2, and only one pressure sensor 30 is provided downstream of the portion where the gas discharge flow path 50 is coupled to the battery modules. In this way, since the gas discharge passage 50 is coupled to one of the cells, it is not necessary to provide the pressure sensor 30 for each cell, and only one pressure sensor 30 is provided downstream of the coupling portion. That is, the number of members of the thermal chain detection system 200 can be reduced.

According to the thermal chain detection system 200, the battery pack 2 is an open-type battery pack, and the voltage sensors (LBC 41) and the controller 40 (LBC 41 and VCM 42) are provided inside the battery pack 2. In this way, since the voltage sensors (LBC 41) and the controller 40 (LBC 41 and VCM 42) are both provided in the battery pack 2, the thermal chain detection system 200 is made compact.

The cell voltage abnormality determination unit 21B and the pressure abnormality determination unit 22B are provided in the VCM 42 according to the first embodiment and in the LBC 41 according to the second embodiment. Alternatively, the present invention is not limited thereto, and a function distribution in the controller 40, that is, functions distributed to the LBC 41 and the VCM 42 are optional.

Further, although the LBC 41 includes voltage sensors in any of the embodiments, the LBC 41 may be separated from the voltage sensors and transmits the cell voltage V detected by the voltage sensors to the controller 40.

The pressure contributing component that contributes to the pressure change in the battery packs 1 and 2 is the refrigerant gas passage 20 according to the first embodiment and is the gas discharge passage 50 according to the second embodiment. Alternatively, the present invention is not limited thereto, and the pressure contributing component may be any component that contributes to the pressure change in the battery packs 1 and 2. In addition, the gas discharge passage 50 may be further provided in the battery pack 1 and the refrigerant gas passage 20 may be further provided in the battery pack 2.

Although the embodiments of the present invention have been described above, the above-mentioned embodiments are merely a part of application examples of the present invention, and does not mean that the technical scope of the present invention is limited to the specific configurations of the above-mentioned embodiments.

Each of the embodiments described above has been described as a single embodiment, and may be appropriately combined.

The invention claimed is:

1. A thermal chain detection system comprising:
   a battery pack housing a plurality of cells;
   a gas discharge passage coupling the plurality of cells and an outside of the battery pack, wherein the gas discharge passage is coupled to one of the plurality of cells in the battery pack and is capable of contributing to a change in a pressure in the battery pack during normal operation of the plurality of cells;
   at least one pressure sensor configured to detect the pressure in the battery pack, wherein only one pressure sensor is provided downstream of a portion of the gas discharge passage where the gas discharge passage is coupled to the one of the plurality of cells;
   at least one voltage sensor configured to detect a voltage of the plurality of cells; and
   a display unit configured to notify and warn that a thermal chain has occurred in the battery pack, and
   a controller configured to:
   determine that the pressure in the battery pack is abnormal when an amount of change in the pressure in the battery pack is greater than a predetermined pressure change amount or a rate of change in the pressure in the battery pack is larger than a predetermined pressure change rate;
   determine that the voltage of the plurality of cells is abnormal when an amount of change in the voltage of the plurality of cells is greater than a predetermined voltage change amount or a rate of change in the voltage of the plurality of cells is greater than a predetermined voltage change rate or an absolute value of the voltage of the plurality of cells is less than a predetermined voltage; and
   cause the display unit to display a thermal chain occurrence notification and warning only when a determination that the pressure in the battery pack is abnormal and a determination that the voltage of the plurality of cells is abnormal are made together,
   wherein the determination that the pressure in the battery pack is abnormal is maintained for a predetermined time even in a case where the amount of change in the pressure in the battery pack becomes equal to or less than the predetermined pressure change amount and the rate of change in the pressure in the battery pack becomes equal to or less than the predetermined pressure change rate after the determination that the pressure in the battery pack is abnormal is made.

2. The thermal chain detection system according to claim 1, wherein
   the controller includes a battery controller receiving input including the pressure detected by the at least one pressure sensor and the voltage detected by the at least one voltage sensor, and a vehicle controller that determines whether the thermal chain occurs, and
   the vehicle controller assumes the amount of change in the voltage of the plurality of cells is greater than the predetermined voltage change amount or the rate of change in the voltage of the plurality of cells is greater than the predetermined voltage change rate or the absolute value of the voltage of the plurality of cells is less than the predetermined voltage in any one of cases where the vehicle controller detects an internal short circuit based on the voltage detected by the at least one voltage sensor, where a voltage value detected by the at least one voltage sensor is an invalid value, or where communication between the battery controller and the vehicle controller is poor.

3. The thermal chain detection system according to claim 1, wherein
   the at least one pressure sensor is provided at a position where the at least one pressure sensor would not be affected by the thermal chain in the battery pack when the thermal chain occurs in the battery pack.

4. The thermal chain detection system according to claim 1, wherein
   the controller includes a battery controller that receives input including the pressure detected by the at least one pressure sensor and the voltage detected by the at least one voltage sensor, and a vehicle controller that determines whether the thermal chain occurs,
   the at least one voltage sensor is provided in the battery pack, and
   the vehicle controller is provided outside the battery pack.

5. The thermal chain detection system according to claim 1, wherein the battery pack is an open-type battery pack, and
the at least one voltage sensor and the controller are provided in the battery pack.

6. A thermal chain detection system, comprising:
a battery pack comprising a plurality of cells, a gas discharge passage coupling at least one of the plurality of cells with an outside of the battery pack, at least one pressure sensor configured to detect pressure in the battery pack, and at least one voltage sensor configured to detect a voltage of at least one cell of the plurality of cells, wherein the gas discharge passage is capable of contributing to a change in pressure in the battery pack during normal operation of the battery pack, and wherein the at least one pressure sensor is provided downstream of where the gas discharge passage is coupled to the at least one of the plurality of cells;
a display unit configured to display at least one of a warning or a notification; and
a controller configured to:
based on input from the at least one pressure sensor and the at least one voltage sensor, determine whether a change in the pressure within the battery pack is related to an occurrence of a thermal chain; and
in response to determining that the change in pressure in the battery pack is due to the thermal chain, cause the display unit to display the at least one of the warning or the notification that the thermal chain has occurred in the battery pack.

7. The thermal chain detection system according to claim 6, wherein the determination that the voltage of the at least one cell of the plurality of cells is abnormal is made in a case where an amount of change or a rate of change in the voltage of the at least one cell of the plurality of cells is larger than a predetermined value or in a case where an absolute value of the voltage of the at least one cell of the plurality of cells is less than a predetermined value.

8. The thermal chain detection system according to claim 6, wherein a downstream portion of the gas discharge passage is closed by an air-permeable membrane that adjusts pressure in the gas discharge passage.

9. The thermal chain detection system according to claim 6, wherein a determination is made that no thermal chain occurs in response to a determination that the pressure in the battery pack is abnormal and a determination that the voltage of the at least one cell of the plurality of cells is normal.

10. The thermal chain detection system according to claim 9, wherein the determination that the pressure in the battery pack is abnormal is made in a case where an amount of change or a rate of change in the pressure in the battery pack is larger than a predetermined value.

11. A thermal chain detection system, comprising:
a battery pack comprising a plurality of cells, a gas discharge passage coupling at least one of the plurality of cells with an outside of the battery pack, at least one pressure sensor configured to detect pressure in the battery pack, and at least one voltage sensor configured to detect a voltage of at least one cell of the plurality of cells, wherein the gas discharge passage is capable of contributing to a change in pressure in the battery pack during normal operation of the battery pack, and wherein the at least one pressure sensor is provided downstream of where the gas discharge passage is coupled to the at least one of the plurality of cells;
a display unit configured to display at least one of a warning or a notification; and
a controller configured to:
determine whether the pressure in the battery pack is abnormal or normal, wherein the pressure in the battery pack is abnormal in a case where an amount of change or a rate of change in the pressure in the battery pack is greater than a predetermined value;
determine whether the voltage of the at least one of the plurality of cells is abnormal or normal, wherein the voltage of the at least one of the plurality of cells is abnormal in a case where an amount of change or a rate of change in the voltage of the at least one of the plurality of cells is greater than a predetermined value or an absolute value of the voltage of the at least one of the plurality of cells is less than a predetermined value;
in response to a determination that the pressure in the battery pack is abnormal and a determination that the voltage of the at least one cell of the plurality of cells is abnormal, determine a thermal chain is occurring;
in response to the determination that the pressure in the battery pack is abnormal and a determination that the voltage of the at least one cell of the plurality of cells is normal, determine that no thermal chain is occurring; and
in response to the determination that the thermal chain is occurring, cause the display unit to display the at least one of the warning or the notification to inform a user of the thermal chain.

* * * * *